Aug. 10, 1937.  A. T. STEPHENSON  2,089,627
PORTABLE PSYCHROMETER
Filed Oct. 9, 1935  2 Sheets-Sheet 1
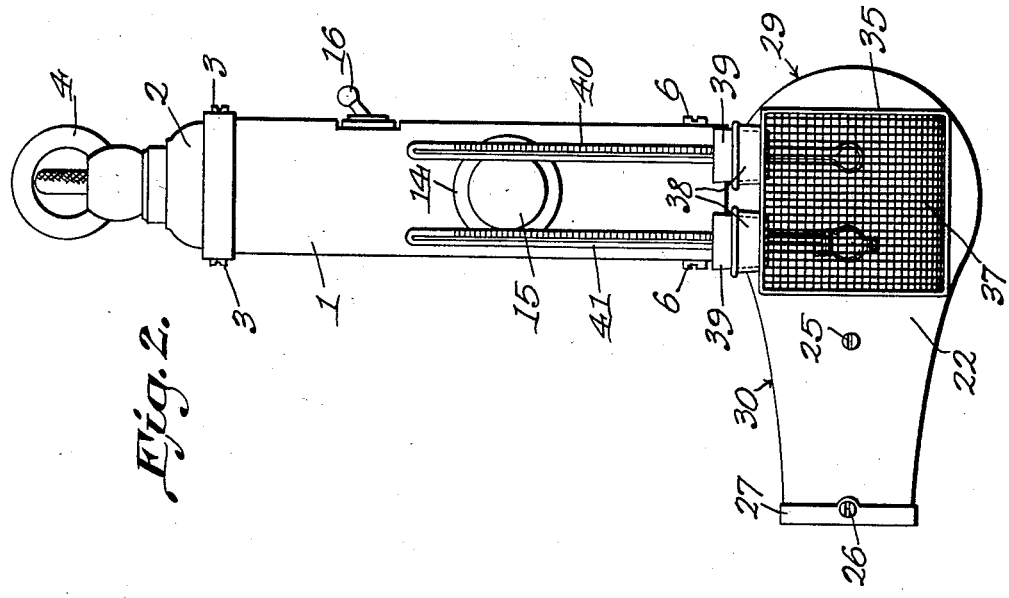
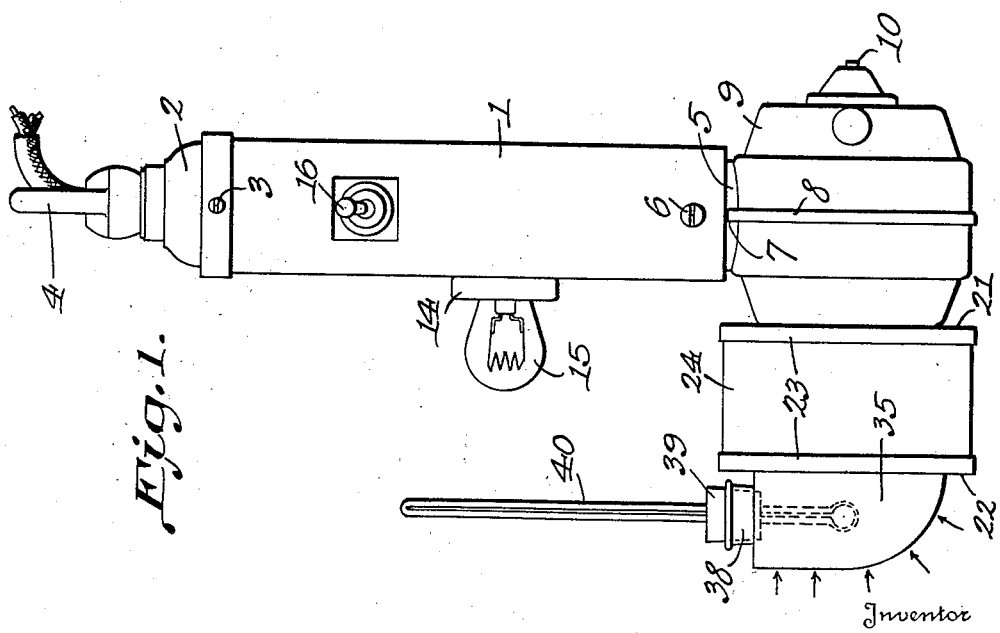
Inventor
A. T. Stephenson
By C. A. Snow & Co.
Attorneys.

Aug. 10, 1937.  A. T. STEPHENSON  2,089,627
PORTABLE PSYCHROMETER
Filed Oct. 9, 1935  2 Sheets-Sheet 2
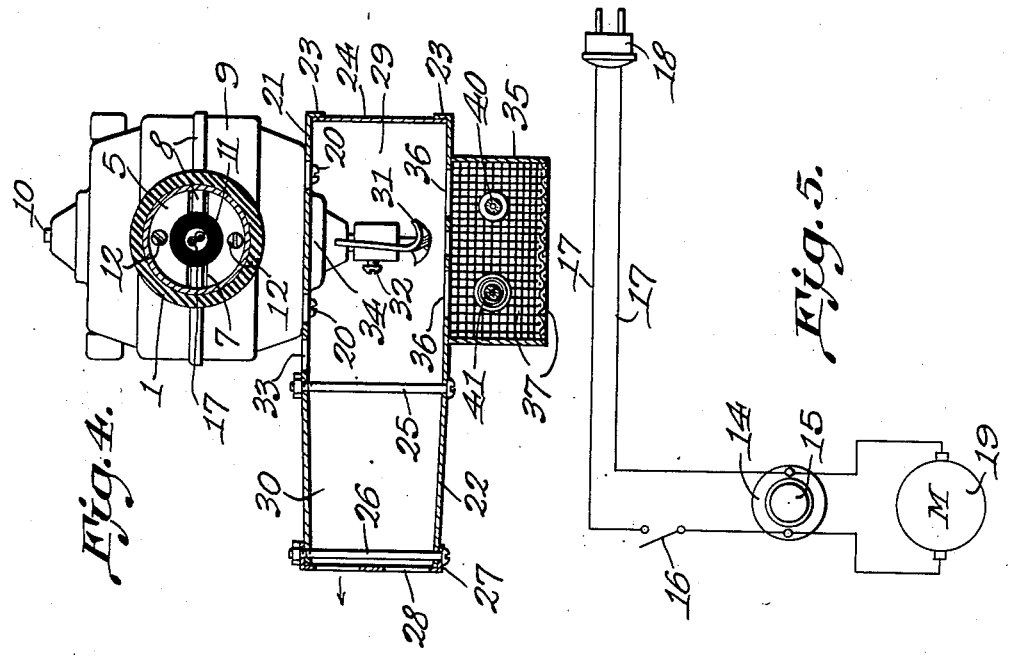
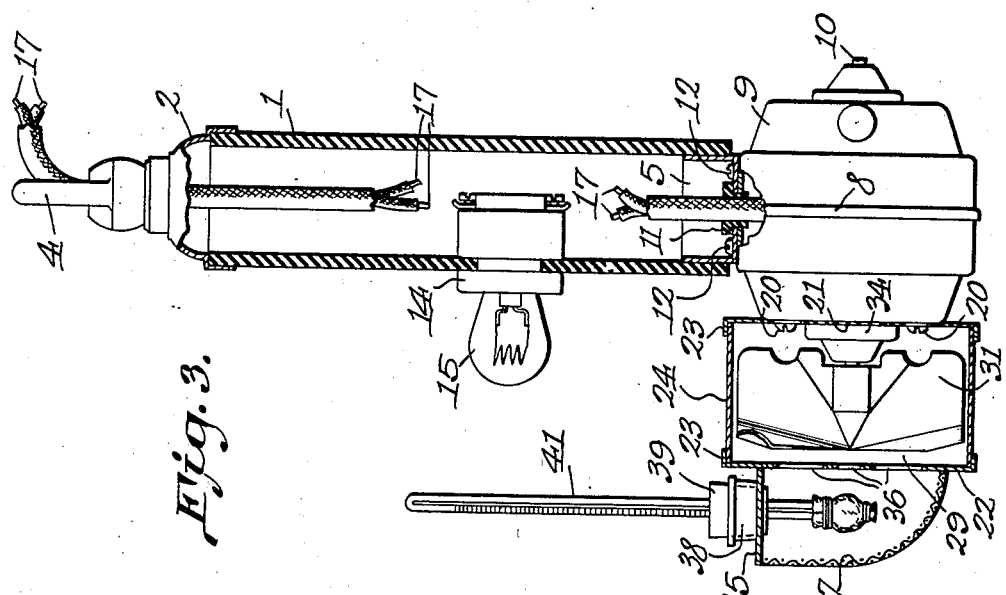
Inventor
A. T. Stephenson
By C. A. Snow & Co.
Attorneys.

Patented Aug. 10, 1937

2,089,627

UNITED STATES PATENT OFFICE 2,089,627

PORTABLE PSYCHROMETER

Andrew Tynes Stephenson, Atascadero, Calif., assignor to Puritan Ice Company, Atascadero, Calif.

Application October 9, 1935, Serial No. 44,309

1 Claim. (Cl. 73—338)

The device forming the subject matter of this application is a psychrometer, and the invention aims to provide a device of the class described, so constructed that it will be compact and readily portable, for suspension at any desired place of use. The invention aims to provide novel means for creating a pronounced draft across the bulbs of the thermometers. A further object of the invention is to provide novel means for illuminating the thermometer, and to provide novel means whereby the draft fan is operated electrically, the illuminating means and the driving motor for the fan being built into the instrument as a part thereof.

A further object of the invention is to supply means for opening and closing the circuit of the lamp and of the motor, said means being carried by a part of the psychrometer.

It is within the province of the disclosure to improve generally and to enhance the utility of devices of that type to which the invention appertains.

With the above and other objects in view, which will appear as the description proceeds, the invention resides in the combination and arrangement of parts and in the details of construction hereinafter described and claimed, it being understood that changes in the precise embodiment of the invention herein disclosed, may be made within the scope of what is claimed, without departing from the spirit of the invention.

In the accompanying drawings:

Fig. 1 shows, in side elevation, a psychrometer constructed in accordance with the invention;

Fig. 2 is an elevation wherein the psychrometer is viewed at right angles to the showing of Fig. 1;

Fig. 3 is a vertical section wherein parts remain in elevation;

Fig. 4 is a transverse section;

Fig. 5 is a circuit diagram.

The psychrometer forming the subject matter of this application comprises a tubular body 1, made of insulating material, and forming a handle by which the article can be carried about readily from place to place, portability being one of the characteristics of the article. A cap 2 is secured at 3 to the upper end of the body 1 and carries a suspension device 4, such as a ring, enabling the instrument to be hung up at any selected place of use.

A cup-shaped closure 5 is held in the lower end of the body 1 by securing elements 6 and has a slot 7 (Fig. 4) in its lower end, for the reception of the rib 8 on the casing 9 of an electric motor 19, the shaft 10 of which is arranged at right angles to the longitudinal axis of the body 1. An insulating thimble 11 is secured in the slot 7 of the closure 5, and the motor casing 9 is attached to the closure, and therefore to the body 1, by securing devices 12.

A socket 14 is mounted on the body 1 and carries a laterally projecting electric lamp 15. The lamp 15 is so located that it will illuminate the thermometers, hereinafter described, a feature which will be evident from Fig. 3 of the drawings. A switch 16, under the control of an operator, is carried by the body 1. The conductors 17 that form the circuit of the motor 19 pass upwardly through the thimble 11, through the tubular body 1, and out of the cap 2, the conductors being joined to a plug 18 or any other appropriate electrical connector. The switch is in the lamp and motor circuit, and the lamp 15 can be extinguished by unscrewing it a little in the socket 14, if the operator does not care to have the lamp lighted whilst the motor 19 is running. The switch 16 controls the motor 19 and also the lamp 15, if the lamp is lighted.

Securing members 20 hold the back plate 21 of an air conduit on one end of the motor casing 9, the air conduit extending to one side of the motor casing, as Figs. 2 and 4 will show. The front plate of the air conduit is marked by the numeral 22. The plates 21 and 22 have marginal flanges 23, within which is located the wall 24 of the air conduit. The plates 22 and 21 are held to the edges of the wall 24 by tightening devices 25 and 26, such as bolts, joining the said plates. The tightening device 25 is disposed intermediate the ends of the air conduit (Fig. 4), and the tightening device 26 is located near the discharge end of the air conduit. The tightening device 26 passes through the flange 27 of a grating 28 and holds the grating on the discharge end of the air conduit.

In elevation (Fig. 2), the air conduit comprises an enlarged fan casing 29 and a reduced outlet spout 30. A part 34 of the motor casing 9 (Fig. 3) extends through the back plate 21 of the air conduit, and one end of the shaft 10 of the motor 19 extends into the fan casing 29 of the air conduit. A suction and blast fan 31 is secured at 32 to the shaft 10 of the motor 19 and operates in the fan casing 29. There is a hole 33 (Fig. 4) in the back plate 21 of the air conduit, close to the motor casing 9, and some of the air passing through the air conduit can find an exit through the hole 33, to aid in cooling the motor 19.

A box-like extension 35 is secured to the front plate 22 of the air conduit, and in the front plate 22 there are openings 36 which establish communication for air between the extension 35 and the fan casing 29. The top of the extension 35, and the ends thereof are closed, but across the outer part of the extension 35, and along the bottom thereof, extends a foraminous protector, for instance a piece of wire netting, marked by the numeral 37. The lower portion of the protector 37 is curved toward the front plate 22 of the air conduit, as Fig. 3 will disclose. The top of the extension 35 carries upstanding nipples 38, in which are mounted closure plugs or corks 39. A dry bulb thermometer 40 is carried by one of the closure plugs 39, and a wet bulb thermometer 41 is carried by the other of the closure plugs. The bulbs of these thermometers are located in the extension 35 that forms part of the air conduit.

The reasons for obtaining wet bulb and dry bulb readings are many and are well understood, it being common, for instance, to take wet bulb and dry bulb readings for the purpose of computing moisture saturation in ice plants and elsewhere. The scales of the thermometers 40 and 41 can be made visible, even in a dark place, by the lamp 15. When the switch 16 is closed, the motor 19 is energized, the fan 31 is put into operation, and air is drawn into the extension 35 through the screen 37, the air passing across the bulbs of the thermometers 40 and 41. The air enters the fan casing 29 through the openings 36 and is expelled by the fan 31 through the spout 30 and the grating 28.

The device is readily portable, and can be hung up anywhere by means of the suspension device 4. The article is self-contained, in that it comprises the electric motor 19 which drives the fan 31; and the control, represented by the switch 16, is likewise embodied in the instrument itself. The lamp 15 permits accurate readings of the thermometers 40 and 41 to be made, even under adverse conditions. The temperature readings can be obtained quickly. The air passes with great speed around the bulbs of the thermometers 40 and 41, accuracy in temperature readings thereby is promoted.

Having thus described the invention, what is claimed is:

A portable psychrometer comprising a vertically elongated body, suspension means on the upper end of the body, an electric motor secured to the lower end of the body and constituting a counterweight tending to keep the psychrometer steady when hung by the suspension means, an air conduit secured to the forward end of the motor and including a laterally extended outlet, the conduit embodying a front wall, a box-like extension carried by the front wall, the extension being open at its front and bottom, a screen covering the front and bottom of the extension, wet and dry bulb thermometers prolonged through the top of the extension and having their bulbs disposed within the extension, means carried by the motor and located in the conduit for producing a draft through the screen and through the extension and through the conduit, to the outlet, the front wall of the conduit having openings behind the bulbs of the thermometers and spaced to distribute air about the bulbs as the air passes from the extension into the conduit, the specified relation of the motor and the conduit affording a base for setting the psychrometer on a support, the outlet being long enough to prevent the psychrometer from tipping over, the specified relation of the motor, the conduit and the extension serving to shorten the psychrometer when it is hung up by the suspension means.

ANDREW TYNES STEPHENSON.